US011200154B2

(12) United States Patent
Partlow et al.

(10) Patent No.: US 11,200,154 B2
(45) Date of Patent: *Dec. 14, 2021

(54) FUNCTION MODIFICATION FOR SOFTWARE APPLICATION TESTING

(71) Applicant: International Business Machines Corporation, Armonk, NY (US)

(72) Inventors: Steven Partlow, Beacon, NY (US); Joseph Griesemer, Dutchess, NY (US); Thomas Rankin, Tillson, NY (US); Frank Hemsing, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 325 days.

This patent is subject to a terminal disclaimer.

(21) Appl. No.: 16/298,065

(22) Filed: Mar. 11, 2019

(65) Prior Publication Data

US 2020/0293435 A1 Sep. 17, 2020

(51) Int. Cl.
*G06F 11/36* (2006.01)
(52) U.S. Cl.
CPC ...... *G06F 11/3688* (2013.01); *G06F 11/3692* (2013.01)
(58) Field of Classification Search
CPC ............ G06F 11/3696; G06F 11/3664; G06F 11/3684; G06F 11/3688; G06F 11/3692
See application file for complete search history.

(56) References Cited

U.S. PATENT DOCUMENTS

| 5,724,273 | A | 3/1998 | Desgrousilliers et al. |
| 6,002,871 | A | 12/1999 | Duggan et al. |
| 6,031,990 | A | 2/2000 | Sivakumar et al. |
| 6,725,399 | B1 | 4/2004 | Bowman |
| 6,907,547 | B2 | 6/2005 | Shaw et al. |
| 6,980,819 | B2 | 12/2005 | Sugaya et al. |
| 6,983,216 | B2 | 1/2006 | Lam et al. |
| 7,299,382 | B2 * | 11/2007 | Jorapur ............... G06F 11/3684 703/22 |
| 7,490,319 | B2 | 2/2009 | Blackwell et al. |
| 7,607,045 | B2 | 10/2009 | Mills et al. |
| 7,673,288 | B1 | 3/2010 | Stroomer |
| 7,707,572 | B2 | 4/2010 | Woollen |
| 7,721,265 | B1 * | 5/2010 | Xu ..................... G06F 9/45512 717/127 |
| 8,087,002 | B2 | 12/2011 | Fjeldstad et al. |

(Continued)

OTHER PUBLICATIONS

Noor et al., "Studying Test Case Failure Prediction for Test Case Prioritization", ACM, pp. 1-10 (Year: 2017).
Wang et al., "Automatic Generation of System Test Cases from Use Case Specifications", ACM, pp. 385-396 (Year: 2015).
Zhang et al., "Davis: A Generic Interface for iRODS and SRB", IEEE, pp. 74-80 (Year: 2009).

(Continued)

*Primary Examiner* — Jigar P Patel
(74) *Attorney, Agent, or Firm* — Cantor Colburn LLP; Teddi Maranzano (57) ABSTRACT

Examples of techniques for function modification for software application testing are described herein. An aspect includes, based on a function call to a function by an application under test that is being tested using a test case in a testing environment, determining whether modification of the function is enabled. Another aspect includes, based on determining that modification of the function is enabled, running the function in a modified mode.

15 Claims, 4 Drawing Sheets

(56) References Cited

U.S. PATENT DOCUMENTS

| | | | |
|---|---|---|---|
| 8,185,877 B1 | 5/2012 | Colcord | |
| 8,429,612 B2 | 4/2013 | Milov | |
| 8,707,263 B2 | 4/2014 | Osenkov et al. | |
| 8,707,265 B2 | 4/2014 | Li | |
| 8,924,934 B2 | 12/2014 | Sullivan et al. | |
| 9,152,542 B2 | 10/2015 | Navalur | |
| 9,542,301 B1 | 1/2017 | Griesemer et al. | |
| 10,534,701 B1 | 1/2020 | Pande et al. | |
| 10,747,651 B1 | 8/2020 | Vanderwall et al. | |
| 2006/0179350 A1 | 8/2006 | Nathan et al. | |
| 2007/0143093 A1* | 6/2007 | Alvey | G06F 11/3696 703/22 |
| 2009/0100345 A1* | 4/2009 | Miller | G06F 40/143 715/738 |
| 2011/0258613 A1* | 10/2011 | Bhogal | G06F 11/3644 717/129 |
| 2015/0264074 A1* | 9/2015 | Mendelev | H04L 63/20 726/25 |
| 2015/0378697 A1* | 12/2015 | Sathyanathan | G06F 8/41 717/146 |
| 2020/0293430 A1 | 9/2020 | Partlow et al. | |

OTHER PUBLICATIONS

Chen et al., "An Approach to Detecting Domain Errors Using Formal Specification-Based Testing", IEEE, 2004, pp. 1-8.

Hiller, "Executable Assertions for Detecting Data Errors in Embedded Control Systems", IEEE, 2000, pp. 1-10.

Liu et al., "Security Testing of Web Applications: A Search-Based Approach for Detecting SQL Injection Vulnerabilities", ACM, 2019, pp. 417-418.

Nicolescu et al., "Detecting soft errors by a purely software approach: method, tools and experimental results", IEEE, 2003, pp. 1-6.

White et al., "A Domain Strategy for Computer Program Testing", IEEE Transactions on Software Engineering, vol. SE-6, No. 3, May 1980, pp. 247-257.

"System and Method for Programming Modification of Existing Testcases to Test New Software Features," IP.com No. IPCOM000218905D, Jun. 8, 2012, 7 pages.

IBM "List of IBM Patents or Patent Applications Treated as Related; (Appendix P)", Filed Mar. 11, 2019, 2 pages.

Partlow et al., "Environment Modification for Software Application Testing," U.S. Appl. No. 16/298,064, filed Mar. 11, 2019.

* cited by examiner

FUNCTION MODIFICATION FOR SOFTWARE APPLICATION TESTING

BACKGROUND

The present techniques relate to computer systems. More specifically, the techniques relate to function modification for software application testing in computer systems.

The process of software development requires numerous phases. One of these phases is testing. A software product may be tested before it is released to identify and address potential errors in the product. For example, a test case may be computer code which verifies a specific path which the software product in development should follow during execution. Testing a software product prior to release may prevent a developer from having to spend significant time and resources to address errors after a software product has been deployed to many customers.

Most computer applications (hereinafter "applications") are complex systems that, due to their complexity, require significant testing to ensure that the application will execute as desired. To facilitate the testing of applications, test cases or test suites (e.g., a collection of test cases) are designed, implemented and used to test a portion or the whole of an application (often referred to as the application under test). The results of these test cases are then analyzed and evaluated. As many applications can be quite complex, a relatively large number of test cases may be required for the testing of a single application.

For example, a test case for a database application may include testing to determine whether data can be added to the database. The testing of the database application using the test case may include various steps to test this aspect of the application, such as: gaining access to update the database, transmitting the update request; receiving confirmation that the update request has been executed; reading from the database to determine if the data in the update request was stored successfully; and then logging off from the database. The testing may generate an output which indicates whether the application successfully or unsuccessfully performed the test case.

SUMMARY

According to one or more embodiments of the present invention, a system includes a processor configured to, based on a function call to a function by an application under test that is being tested using a test case in a testing environment, determine whether modification of the function is enabled. The processor may be further configured to, based on determining that modification of the function is enabled, run the function in a modified mode According to one or more embodiments of the present invention, a computer-implemented method may include, based on a function call to a function by an application under test that is being tested using a test case in a testing environment, determining, by a processor, whether modification of the function is enabled. The method may further include, based on determining that modification of the function is enabled, running, by the processor, the function in a modified mode According to one or more embodiments of the present invention, a computer program product includes a computer readable storage medium having program instructions embodied therewith, the program instructions executable by a processing device to cause the processing device to perform a method that includes, based on a function call to a function by an application under test that is being tested using a test case in a testing environment, determining whether modification of the function is enabled. The method may further include, based on determining that modification of the function is enabled, running the function in a modified mode.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

Embodiments of function modification for software application testing are provided, with exemplary embodiments being discussed below in detail. Software may be tested by adding new test cases to exercise the software code. When a new function is introduced into an application, many test cases may be needed to drive the application, in many different environments and in combination with existing services, in order to test the function. Generating new test cases may be time-consuming, and may miss edge cases for rare situations. Modification of existing test cases may be performed to implicitly test new functions using existing test cases. For example, a function of a software application may perform a memory access, such as a read or write. Modification of a test case that calls the function may enable testing of the function in a modified mode when accessing the memory. In some embodiments, a called function may first be performed in a normal mode, and then additionally performed in the modified mode, e.g., when the function performs a read of memory, there may be an additional attempt to read the memory in the modified mode. If the modified mode is determined to be incompatible (e.g., the read failed), the testing may catch the error and return to the test case. In various embodiments, any existing test cases that drive many different scenarios may be used in conjunction with function modification to test an increased range of application behavior.

In some embodiments, function modification may be enabled by a global switch in the testing environment. The global switch may specify whether function modification is enabled, and may further specify the type of modification that is enabled. For example, test cases that drive a certain application programming interface (API) during testing of an application may use a different API that should be run in a different situation (such as using a new keyword). In some embodiments, changing the mode may include adding delays before or after certain functions. Performing of the function (e.g., a read or write of storage) in the modified mode may drive additional fault paths in the application. Error suppression may allow the test case to continue if the modified mode function is not allowed. Dumps or other unexpected results may be monitored. Further checks may be performed to verify that memory structures are in an acceptable state after performing the function in the modified mode.

Figure 1:
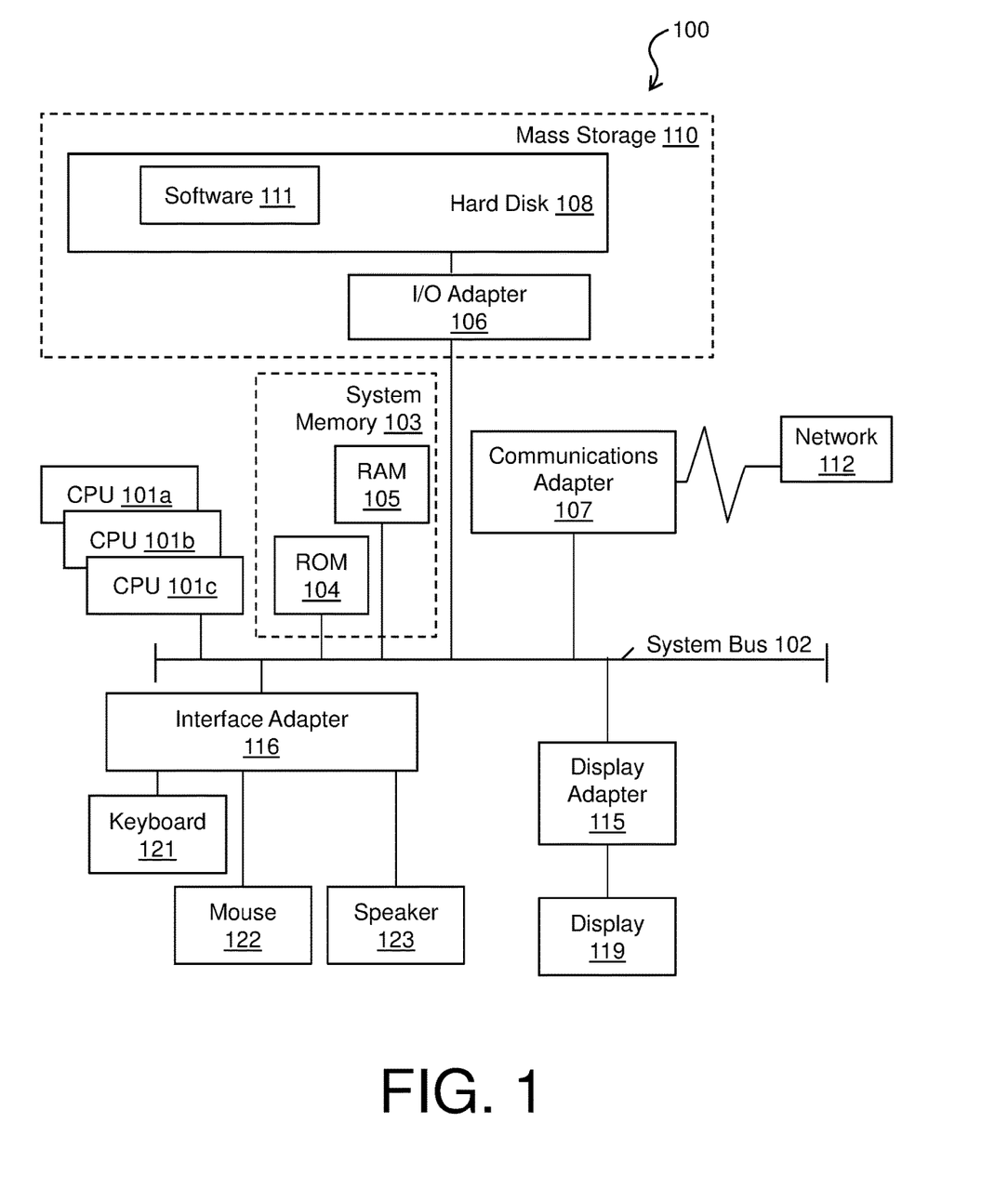
FIG. 1 is a block diagram of an example computer system for function modification for software application testing.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and in one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
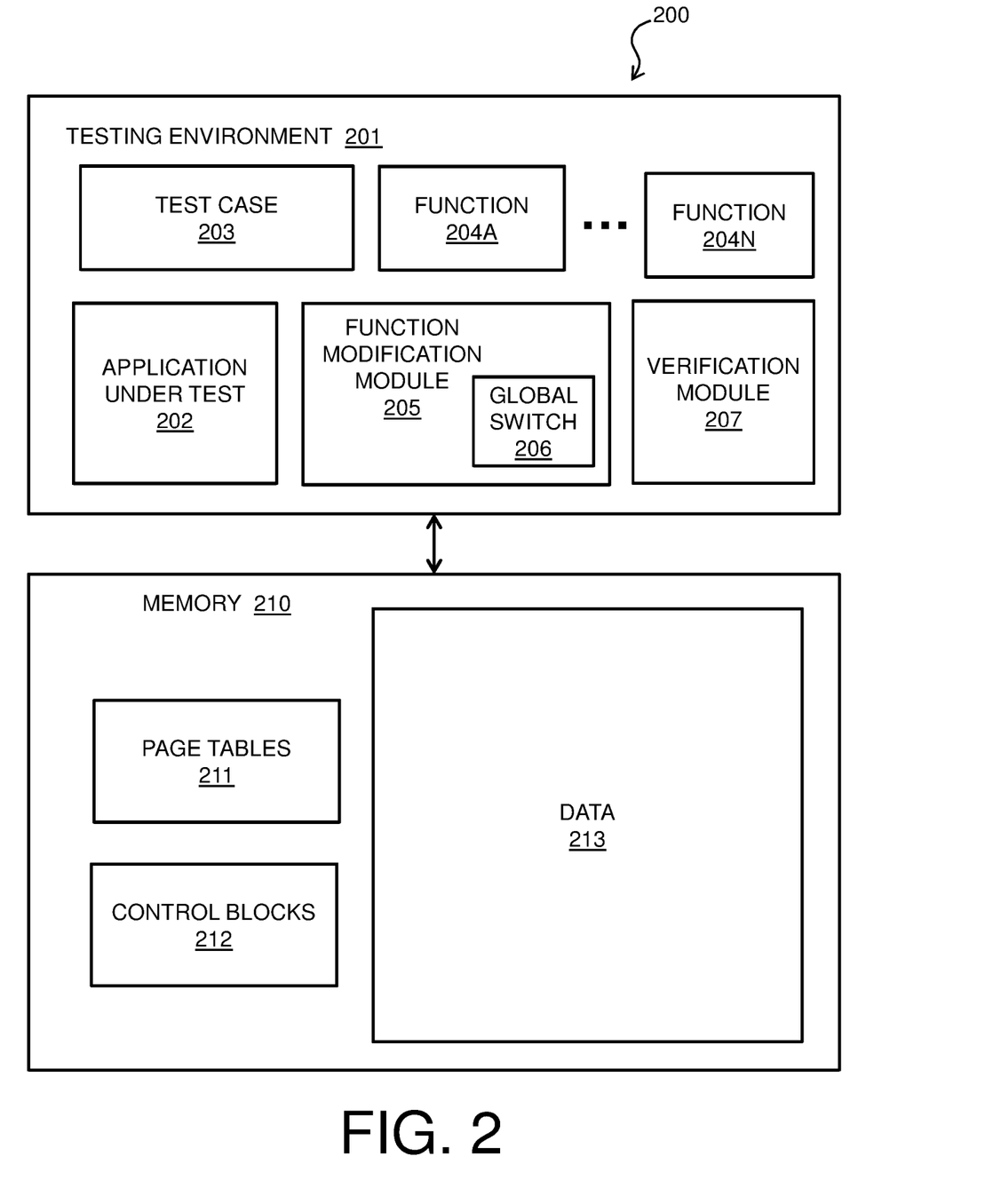
FIG. 2 is a block diagram of an example system for function modification for software application testing.

FIG. 2 is a block diagram of an example system 200 for function modification for software application testing. System 200 may be implemented with any suitable computing device, such as the computer system 100 of FIG. 1. System 200 includes testing environment 201 that is in communication with a memory 210. The testing environment 201 includes a test case 203 (which may be one of a plurality of test cases in the testing environment 201) that is used to test an application under test 202. During the testing of the application under test 202 using the test case 203, the application under test 202 may call one or more of functions 204A-N. In some embodiments, functions 204A-N may be part of an API. Functions 204A-N may include any appropriate functions, including but not limited to memory operations such as reading or writing of memory, fixing memory, and obtaining locks. The testing environment 201 further includes a function modification module 205. The function modification module 205 may include a global switch 206 that may be set by, for example, an administrator of the testing environment 201. The global switch 206 in function modification module 205 may enable modification of functions, such as functions 204A-N, that may be called by the application under test 202 during testing using the test case 203. The function modification module 205 may also handle any errors that are encountered during the testing of the application under test 202 using the test case 203. Memory 210 may be accessed during testing of the application under test 202 by the test case 203. Memory 210 includes page tables 211, control blocks 212, and data 213. The memory 210 may be accessed by application under test 202 using any of functions 204A-N. Verification module 207 may examine page tables 211, control blocks 212, and/or data 213 in memory 210 to determine if any errors occurred during the performance of a function such as function 204A in a modified mode.

In some embodiments, when the application under test 202 calls a function 204A, the function 204A may first be performed in normal mode, and subsequently performed in the modified mode. In other embodiments, the function 204A may only be performed in the modified mode, based on the state of global switch 206. In some embodiments, it may be determined, based on the function call by the application under test 202, whether the function 204A should be performed in both the normal and modified mode based on the global switch 206. The global switch 206 may also specify the particular modified mode to use. In some embodiments, the modified mode may include adding delays before or after certain functions. In some embodiments, the modified mode may include using a different API (such as using a new keyword). For example, if the function 204A performs a read in memory 210, there may be an additional attempt to read the memory 210 in the modified mode by the function 204A. If the modified mode is determined to be incompatible (e.g., the read fails), the function modification module 205 may catch the error and return to the test case 203. Dumps or other unexpected results may be monitored by the verification module 207. Further checks may be performed by verification module 207 to verify that memory structures in memory 210 are in an acceptable state after performing the function 204A in the modified mode.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional memory components, embedded controllers, modules, additional network interfaces, applications, test cases, functions, test suites, memory control structures, APIs, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
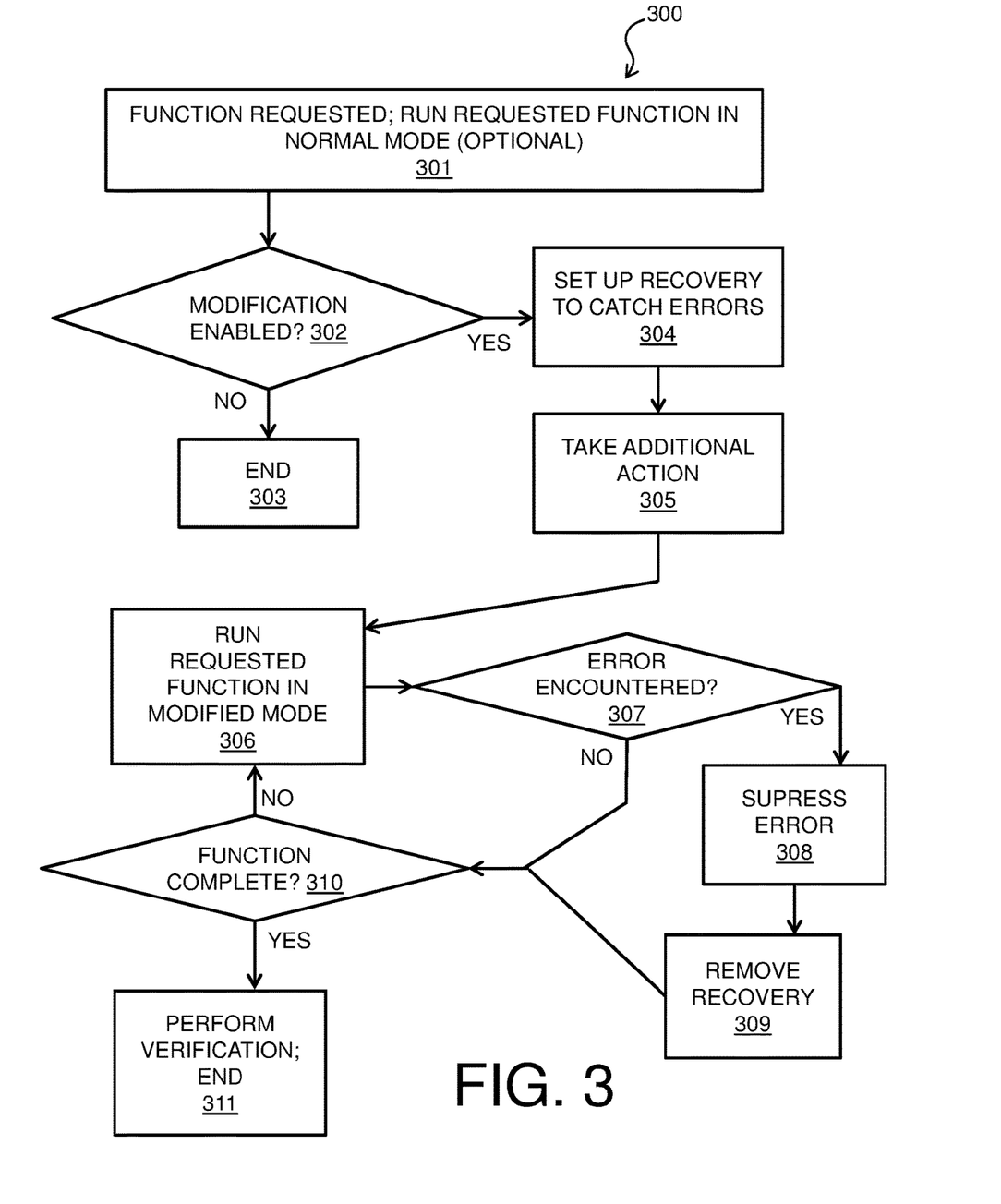
FIG. 3 is a process flow diagram of an example method for function modification for software application testing.

FIG. 3 is a process flow diagram of an example method 300 for function modification for software application testing. The method 300 can be implemented with any suitable computing device, such as the computer system 100 of FIG. 1, and may be implemented in system 200 of FIG. 2. In block 301 of method 300, a test case 203 in a testing environment 201 that is testing an application under test 202 calls a function (e.g., any of functions 204A-N) as part of the testing. A function such as function 204A may be called for any appropriate task that is required by application under test 202, including but not limited to reading or writing of memory, fixing memory, and obtaining locks. In some embodiments, the function 204A may optionally be run in a normal mode in response to the function call of block 301 by the application under test 202, in addition to running the function 204A in the modified mode as described below. In various embodiments, the running of the function in the normal mode based on the function call of block 301 may be performed either before or after the running of the function in the modified mode. In some embodiments, the normal mode may include running the function 204A in an "authorized" mode. For example, authorized mode may include running in a system key, supervisor state, a program key mask (PKM) that includes system keys, and/or APF authorization. In block 302, it is determined whether modification of the function is enabled. The determination of block 302 may be made based on global switch 206 that is set in a function modification module 205 in some embodiments. The global switch 206 may be set by, for example, an administrator of the testing environment 201. The global switch 206 allows function modification to be turned on and off as needed, and may apply to calls to any or all of functions 204A-N. In some embodiments, the global switch 206 may be turned on or off for an entire test suite that includes test case 203. The global switch 206 may further specify a type of modification to use for function calls. If it is determined in block 302 that no modification of the function is desired, then flow proceeds to block 303, in which method 300 ends.

If it is determined in block 302 that function modification is enabled, flow proceeds from block 302 to block 304. In block 304, recovery is set up by function modification module 205 to catch errors that might inadvertently be introduced due to the modification of the function 204A. In some embodiments, a function recovery routine (FRR) or extended specify task abnormal exit (ESTAE) may be implemented in function modification module 205; however, any appropriate types of recovery can be used in various embodiments. Flow proceeds from block 304 to block 305. In block 305, one or more additional actions to modify the test case 203 may be taken by the function modification module 205. For example, if test case 203 is testing the memory management of the application under test 202, some or all of the memory being acted on by the requested function 204A may be paged out to auxiliary storage. Memory management behaves differently when pages are on auxiliary storage; therefore, this action may be performed in block 305 to ensure more thorough testing. In another example of an action that may be performed in block 305, paging I/O either in or out may be initiated. Any appropriate action may be taken by function modification module 205 in block 305 to modify the running of the function 204A.

From block 305, flow proceeds to block 306, in which the requested function 204A is run in the modified mode. In some embodiments, the modified mode may include adding delays before or after certain functions. In some embodiments, the modified mode may include using a different API (such as using a new keyword). In some embodiments, the modified mode may include running the function 204A in an "unauthorized" mode. It is then determined in block 307 whether any error is encountered in the running of the function in the modified mode. If no error is encountered in block 307, flow proceeds from block 307 to block 310, in which it is determined whether the function is complete. If it is determined in block 310 that the function is not complete, the flow returns to block 306 from block 310. The function continues to run in the modified mode in block 306, and errors are monitored in block 307. If an error is encountered in block 307, flow proceeds to block 308. In block 308, the error is suppressed by the function modification module 205, so that the function 204A may continue execution to completion. For example, an action such as trying to page out memory that is fixed, or while running disabled, may cause an error in function 204A. In another example, a memory read or write may fail due to the function 204A being run in an "unauthorized" mode. Instead of failing, the error management by the function modification module 205 may suppress such errors and continue running function 204A. However, in some embodiments, there may be types of errors that are not suppressed by the function modification module 205, such as unexpected system errors. In such embodiments, the testing environment 201 may automatically collect additional diagnostics, such as a system dump, which will not be suppressed. Flow then proceeds from block 308 to block 309. In block 309, any recovery that was added based on the error that was detected in block 307 is removed, so that the function 204A continues on to completion.

Flow then proceeds from block 309 back to block 310. In block 310, it is determined whether the function is complete. If it is determined in block 310 that the function 204A is not complete, flow returns to block 306 from block 310, and the function 204A continues running according to block 306, and errors continue to be monitored according to blocks 307, 308, and 309. When it is determined in block 310 that the function 204A is complete, flow proceeds from block 310 to block 311. In block 311, additional verification is performed by verification module 207, and method 300 ends. For example, the verification module 207 may inspect error logs that were generated by running the function in the modified mode, and may also inspect control structures (e.g., page tables 211 and/or control blocks 212) in memory 210 for consistency in block 311. In an embodiment that includes paging out of the memory, the verification module 207 may ensure that the memory was paged correctly, and no data was lost, in block 311. Method 300 may be triggered whenever an application under test 202 calls a function such as function 204A during testing in a testing environment 201 using a test case 203.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
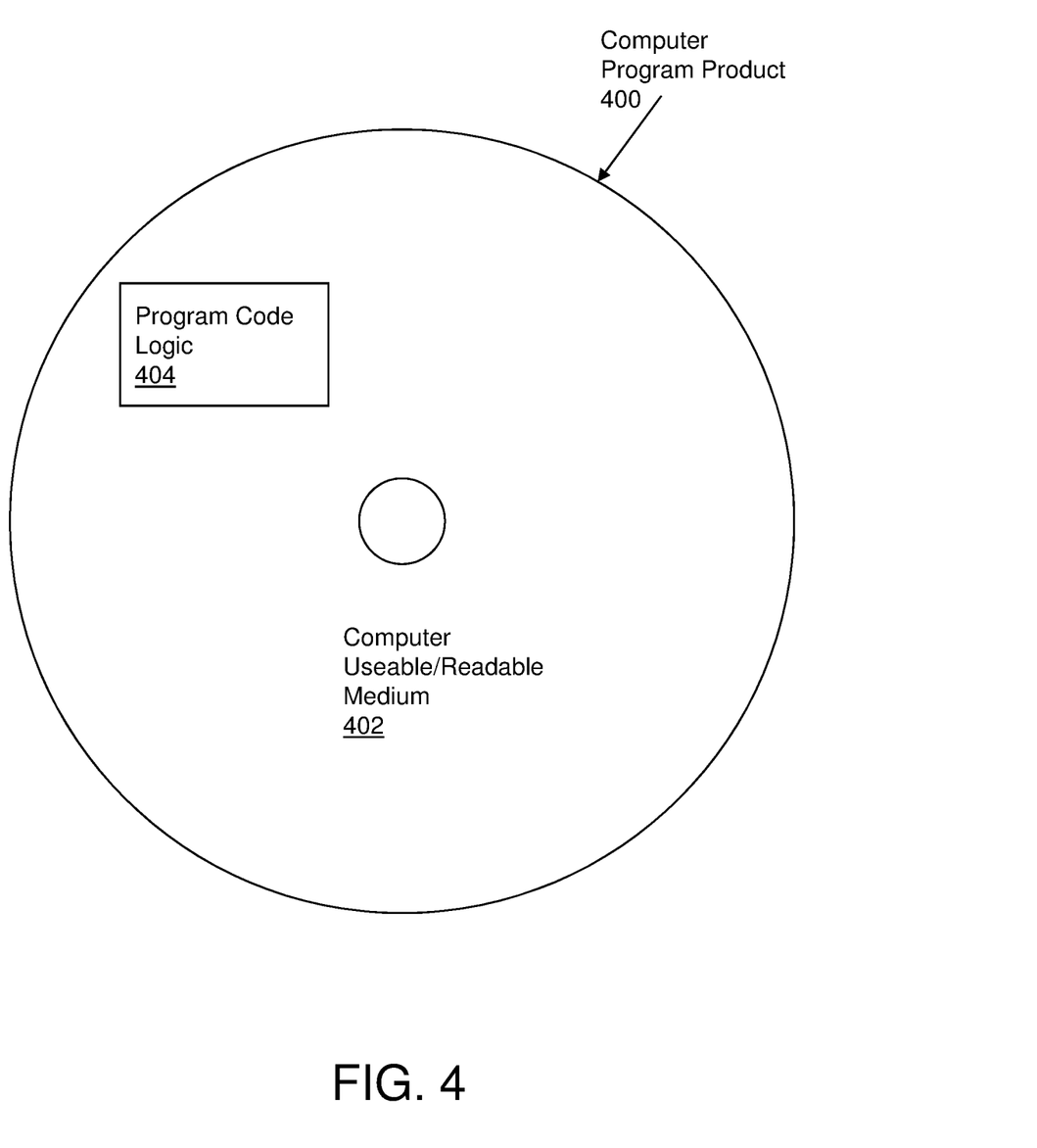
FIG. 4 is an example computer program product that may be used in conjunction with function modification for software application testing.

Referring now to FIG. 4, a computer program product 400 in accordance with an embodiment that includes a computer-readable storage medium 402 and program instructions 404 is generally shown. Computer program product 400 may be used in conjunction with embodiments of for function modification for software application testing, as described with respect to FIG. 2 and FIG. 3.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions. These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks. The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:
based on a function call to a function by an application under test that is being tested using a test case in a testing environment:
determine whether modification of the function is enabled; and
based on determining that modification of the function is enabled:
set up function recovery;
run the function in a modified mode;
detect an error during the running of the function in the modified mode; and
based on the detecting of the error during the running of the function in the modified mode:
suppress the error by the function recovery; and
based on the suppressing of the error by the function recovery, continue the running of the function in the modified mode;
determine that the running of the function in the modified mode is complete; and
based on determining that the running the function in the modified mode is complete, perform a verification of the running of the function in the modified modes, wherein performing the verification of the running of the function in the modified mode comprises:
inspecting of an error log that was generated by the running of the function in the modified mode; and
inspecting a control structure in a memory that was accessed by the running of the function in the modified mode.

2. The system of claim 1, the processor configured to:
based on the function call, run the function in a normal mode before or after running the function in the modified mode using the test case in the testing environment.

3. The system of claim 2, wherein the normal mode comprises an authorized mode, and the modified mode comprises an unauthorized mode.

4. The system of claim 1, wherein determining whether modification of the function is enabled comprises checking a global switch that is set in the testing environment.

5. The system of claim 4, wherein the global switch applies to a test suite that includes the test case.

6. A computer-implemented method, comprising:
based on a function call to a function by an application under test that is being tested using a test case in a testing environment:
   determining, by a processor, whether modification of the function is enabled; and
   based on determining that modification of the function is enabled:
      setting up function recovery;
      running the function in a modified mode;
      detecting an error during the running of the function in the modified mode; and
      based on the detecting of the error during the running of the function in the modified mode:
         suppressing the error by the function recovery; and
         based on the suppressing of the error by the function recovery, continuing the running of the function in the modified mode;
      determining that the running of the function in the modified mode is complete; and
      based on determining that the running the function in the modified mode is complete, performing a verification of the running of the function in the modified modes, wherein performing the verification of the running of the function in the modified mode comprises:
         inspecting of an error log that was generated by the running of the function in the modified mode; and
         inspecting a control structure in a memory that was accessed by the running of the function in the modified mode.

7. The computer-implemented method of claim 6, comprising:
based on the function call, running the function in a normal mode before or after running the function in the modified mode using the test case in the testing environment.

8. The computer-implemented method of claim 7, wherein the normal mode comprises an authorized mode, and the modified mode comprises an unauthorized mode.

9. The computer-implemented method of claim 6, wherein determining whether modification of the function is enabled comprises checking a global switch that is set in the testing environment.

10. The computer-implemented method of claim 9, wherein the global switch applies to a test suite that includes the test case.

11. A computer program product comprising:
a non-transitory computer readable storage medium having program instructions embodied therewith, the program instructions executable by a processing device to cause the processing device to perform a method comprising:
based on a function call to a function by an application under test that is being tested using a test case in a testing environment:
   determining whether modification of the function is enabled; and
   based on determining that modification of the function is enabled:
      setting up function recovery;
      running the function in a modified mode;
      detecting an error during the running of the function in the modified mode; and
      based on the detecting of the error during the running of the function in the modified mode:
         suppressing the error by the function recovery; and
         based on the suppressing of the error by the function recovery, continuing the running of the function in the modified mode;
      determining that the running of the function in the modified mode is complete; and
      based on determining that the running the function in the modified mode is complete, performing a verification of the running of the function in the modified modes, wherein performing the verification of the running of the function in the modified mode comprises:
         inspecting of an error log that was generated by the running of the function in the modified mode; and
         inspecting a control structure in a memory that was accessed by the running of the function in the modified mode.

12. The computer program product of claim 11, the method comprising:
based on the function call, running the function in a normal mode before or after running the function in the modified mode using the test case in the testing environment.

13. The computer program product of claim 12, wherein the normal mode comprises an authorized mode, and the modified mode comprises an unauthorized mode.

14. The computer program product of claim 11, wherein determining whether modification of the function is enabled comprises checking a global switch that is set in the testing environment.

15. The computer program product of claim 14, wherein the global switch applies to a test suite that includes the test case.

* * * * *